United States Patent
Wang et al.

(10) Patent No.: US 12,455,806 B2
(45) Date of Patent: Oct. 28, 2025

(54) RUNTIME ERROR ATTRIBUTION FOR DATABASE QUERIES SPECIFIED USING A DECLARATIVE DATABASE QUERY LANGUAGE

(71) Applicant: Databricks, Inc., San Francisco, CA (US)

(72) Inventors: Gengliang Wang, San Francisco, CA (US); Wenchen Fan, Zhejiang (CN); Serge Rielau, San Francisco, CA (US); Entong Shen, San Francisco, CA (US)

(73) Assignee: Databricks, Inc., San Francisco, CA (US)

( * ) Notice: Subject to any disclaimer, the term of this patent is extended or adjusted under 35 U.S.C. 154(b) by 236 days.

(21) Appl. No.: 18/296,876

(22) Filed: Apr. 6, 2023

(65) Prior Publication Data

US 2024/0256426 A1   Aug. 1, 2024

Related U.S. Application Data

(63) Continuation of application No. PCT/CN2023/073691, filed on Jan. 29, 2023.

(51) Int. Cl.
*G06F 11/3604* (2025.01)
*G06F 16/25* (2019.01)
*G06F 16/901* (2019.01)

(52) U.S. Cl.
CPC ........ *G06F 11/3612* (2013.01); *G06F 16/258* (2019.01); *G06F 16/9024* (2019.01)

(58) Field of Classification Search
CPC . G06F 11/3612; G06F 16/258; G06F 16/9024
See application file for complete search history.

(56) References Cited

U.S. PATENT DOCUMENTS

| | | | |
|---|---|---|---|
| 7,761,450 B1 * | 7/2010 | Ordonez | G06F 16/2457 |
| | | | 707/736 |
| 9,424,119 B2 * | 8/2016 | Ercegovac | G06F 11/0751 |
| 11,461,324 B2 * | 10/2022 | Fender | G06F 16/24535 |

(Continued)

FOREIGN PATENT DOCUMENTS

| | | | |
|---|---|---|---|
| CN | 103209094 A | * | 7/2013 |
| CN | 114341832 A | | 4/2022 |

OTHER PUBLICATIONS

PCT International Search Report and Written Opinion, PCT Application No. PCT/CN2023/073691, Oct. 7, 2023, 8 pages.

*Primary Examiner* — Daxin Wu
(74) *Attorney, Agent, or Firm* — Fenwick & West LLP

(57) ABSTRACT

A system executes database queries specified using a declarative database query language such as the structured query language (SQL). The system determines whether a runtime error is encountered during execution of a query, for example, a division by zero error, resource usage errors such as out of memory error, time out error, and so on. The system reports such runtime errors encountered during execution of a database query. The system identifies one or more origins of the runtime error in the database query. The origin identifies a portion of the database query that represents a cause of the runtime error. Reporting the origin of a runtime error in the database query simplifies the task of development and testing of database queries.

19 Claims, 10 Drawing Sheets

(56) References Cited

U.S. PATENT DOCUMENTS

| | | | |
|---|---|---|---|
| 11,663,205 B2* | 5/2023 | Levine | G06F 16/252 |
| | | | 707/713 |
| 11,704,306 B2* | 7/2023 | Zukowski | H04L 63/101 |
| | | | 707/803 |
| 2009/0144232 A1* | 6/2009 | Duffy | G06F 16/90335 |
| 2013/0346435 A1* | 12/2013 | Machol | G06F 16/3322 |
| | | | 707/E17.014 |
| 2014/0280035 A1* | 9/2014 | Fraser | G06F 16/24542 |
| | | | 707/718 |
| 2014/0283096 A1* | 9/2014 | Neerumalla | G06F 21/10 |
| | | | 726/26 |
| 2017/0031777 A1* | 2/2017 | Wang | G06F 11/1464 |
| 2018/0121326 A1* | 5/2018 | Qi | G06F 11/3636 |
| 2018/0322168 A1* | 11/2018 | Levine | G06F 16/2471 |
| 2019/0121807 A1* | 4/2019 | Boutros | G06F 16/9024 |
| 2020/0026790 A1* | 1/2020 | Maclean | G06F 16/904 |
| 2020/0073987 A1* | 3/2020 | Perumala | G06F 16/24545 |
| 2021/0081409 A1* | 3/2021 | Rath | G06F 11/3419 |
| 2022/0405193 A1* | 12/2022 | Ashok | G06F 11/004 |

* cited by examiner

RUNTIME ERROR ATTRIBUTION FOR DATABASE QUERIES SPECIFIED USING A DECLARATIVE DATABASE QUERY LANGUAGE

CROSS REFERENCE TO RELATED APPLICATIONS

This application is a continuation of International PCT Patent Application No. PCT/CN2023/073691, filed on Jan. 23, 2023, which is incorporated by reference in its entirety.

TECHNICAL FIELD

The disclosed configurations relate generally to databases, and more specifically to attribution of runtime errors encountered while executing database queries specified using declarative database query languages.

BACKGROUND

Database systems support database query languages such as the structured query language (SQL) used by applications to interact with the database system. Database systems may encounter runtime errors while executing a database query and return an error code indicating the type of error that was encountered. A user, for example, a developer analyzing the runtime error returned by the database query, maps the error code to an error message that describes the error. For example, an error code may map to a division by zero error indicating that the database system encountered the division by zero error while processing a particular record or set of records using the database query.

Applications often execute database queries that are complex. For example, a database query may be several lines or even pages long and may include subqueries, views, calls to functions, multiple expressions, and so on. For such complex database queries, the information provided by the conventional error reporting mechanisms requires significant analysis to determine a root cause of the error. For example, if there are multiple division operations in the database query, a developer may have to analyze the execution plan of the database query to determine which division operation caused the division by zero error. Execution plans are complex and difficult to analyze since they is meant to be processed by the database system and not expected to be user friendly. This requires significant effort on the part of users who are developing and testing applications using the database system and provide a poor developer experience.

BRIEF DESCRIPTION OF THE DRAWINGS

Figure (FIG. 1 is a high-level block diagram of a system environment for a data processing service, in accordance with an embodiment.

Figure 1:
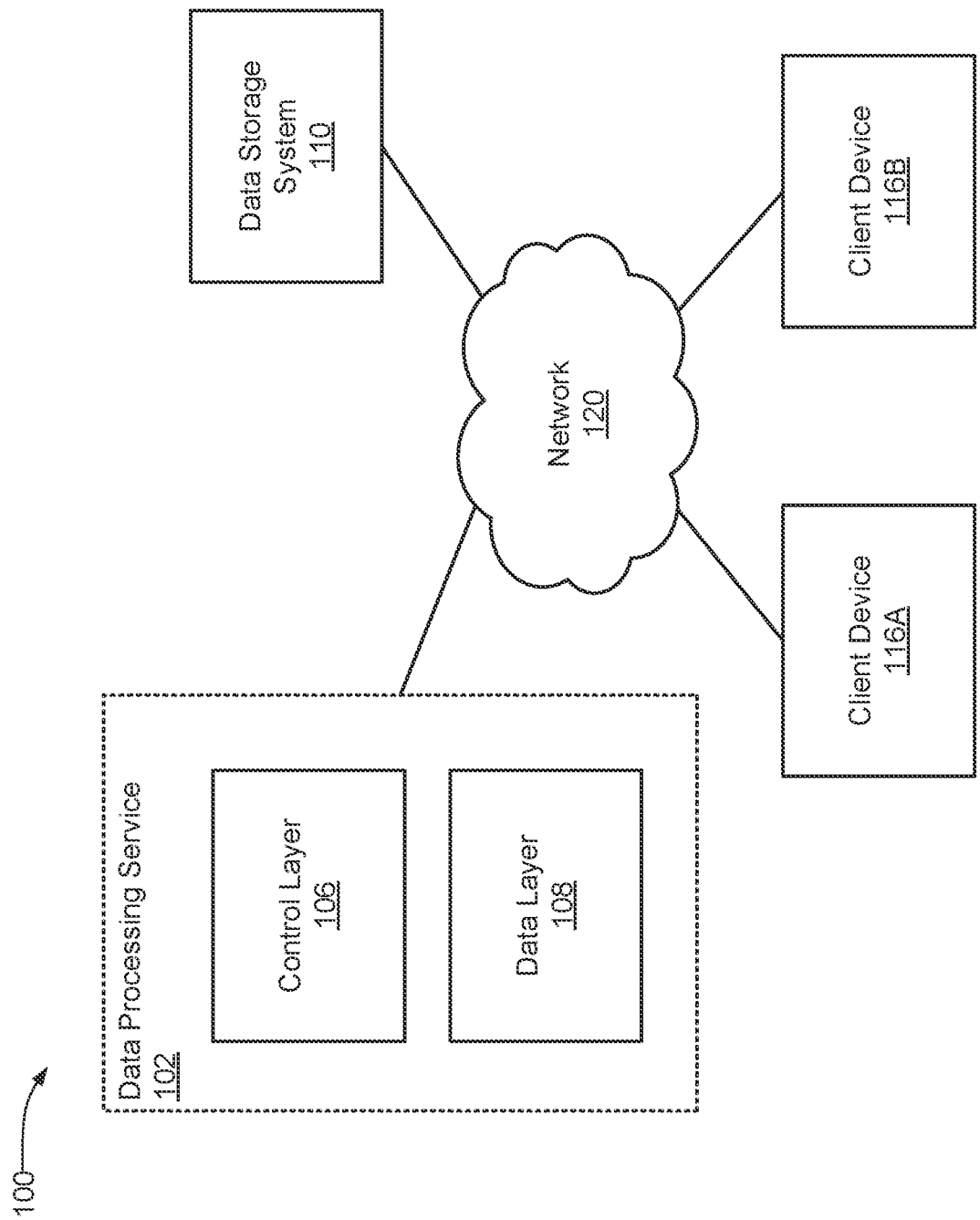

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A database system allows users to execute database queries specified using a database query language. According to an embodiment, the database query language is a declarative language such as the structured query language (SQL). Although the embodiments described herein use SQL as an exemplary database query language, the techniques disclosed herein are not limited to SQL. The database query language allows users to specify various types of operations such as a join operation, group by operation, aggregation operation (e.g., count, sum, maximum, minimum, average, and so on), mathematical operations (e.g., addition, subtraction, multiplication, division), and logical operations (e.g., AND, OR, NOT, and so on). The operations may result in various runtime errors during execution of a query. Examples of runtime errors include mathematical errors such as a division by zero error, resource usage errors such as out of memory error, time out error, and so on, or database query errors such as a scalar query returning multiple values. A database system reports such runtime errors that may be encountered during execution of a database query.

Conventional database systems return an error code that is specific to the error encountered. A user may look up the error code to determine the runtime error that was encountered. The user may have to perform complex analysis to determine the root cause of the error, for example, by analyzing the execution plan generated by the database query. The execution plan generated by a database query is often complex and significantly different from a database query expressed using a declarative database query language. This is so because the declarative database query language hides the procedural aspects of a computation and allows users to express the desired result without considering the details of the procedures used for obtaining the results. In contrast, the execution plan of the database query includes all the procedural details for obtaining the results described by the user. The execution plan also reflects the various transformations performed on the query to optimize the execution path. As a result, the user analyzing the runtime error is forced to analyze the procedural details of the database query that the declarative database query language hides from the user, thereby defeating the purpose of using the declarative database query language.

For complex database queries, the user may spend significant effort in analyzing the database query to determine the cause of the runtime error and how to fix the runtime error. For example, a complex database query may include multiple mathematical expressions such that there are multiple occurrences of a division operator. If the database system returns an error code indicating that a division by zero error occurred, the developer has to spend significant effort identifying the specific division operator that caused the error. Similarly, a complex database query may include multiple database operators such as join operators, group by operators, sort operator, and so on. If the database system returns an error indicating that an out of memory error was encountered since the database system ran out of memory while executing the database query, a developer may have to spend significant effort to determine the exact database operator that was the cause of the out of memory error.

To alleviate these issues, a data processing service (e.g., database system), according to various embodiments, provides for attribution of runtime errors encountered while executing database queries specified using declarative database query languages. To accomplish this, the data processing service identifies a position (also referred to as the location) of a portion of the database query that represents a root cause of a runtime error. For example, if a division by zero runtime error occurs while executing a database query, the data processing service identifies the position of the division operator that caused the division by zero error. As another example, if the data processing service runs out of resources while executing a database query, for example, resulting in out of memory error indicating that the memory usage while executing the database query exceeded an allotted amount of memory, the data processing service identifies an operator that caused the out of memory error. Similarly, the data processing service may encounter other resource usage errors and identify a specific operator specified in the database query that caused the resource usage error. In instances in which a database query includes multiple subqueries and an error is encountered indicating that a scalar query returned multiple values, the data processing service identifies the specific subquery that caused the runtime error.

Since database queries are specified using a declarative language, the code (or instructions) that are executed at runtime are significantly different from the database query that is specified by the user. For example, a database query specified using a declarative database query language specifies the result that the user wants from the database, but does not specify the procedural steps for calculating the result. In other words, a database query specified using a declarative database query language specifies what the user wants but does not specify how the results should be determined. Accordingly, the data processing service generates the instructions for calculating the desired result based on the specification. As a result, the instructions that are executed for processing a database query are significantly distinct from the specification of the database query.

The data processing service receives a source database query and generates a representation of the source database query. The data processing service performs several transformations of the representation of the database query to generate the code that is ultimately executed. For example, the representation of a database query may be a graph model comprising nodes that represent data or operators and edges that represent data flow. Throughout the transformation and generation process, the data processing service tracks an origin of each portion of the representation or set of instructions that are generated. The origin maps a portion of a representation obtained by performing transformations of the source database query or a set of instructions obtained from the source database query to a position of a portion of the source database query that caused the generation of the portion of the representation or the set of instructions. The data processing service maps an error caused by a set of instructions to one or more origins in the source database query to determine the root cause of the runtime error. The database system reports the origins of the runtime error along with the runtime errors, thereby providing additional information describing the runtime error.

By providing an exact location of a portion of the database query that caused a runtime error, the data processing service improves the user experience of users of the data processing service, such as developers that develop database applications using the data processing service. For example, development, testing, and debugging of database queries and applications utilizing the database is simplified. This further results in saving of computing system resources by reducing the development time and effort needed for testing, development, and deployment of database applications.

The techniques described herein are implemented as computer-implemented methods for performing error attribution of database queries. The techniques described herein further relate to a non-transitory computer-readable storage medium for storing instructions that when executed by one or more computer processors cause the one or more computer processors to perform the above methods. The techniques described herein further relate to a computer system including one or more computer processors and a non-transitory computer-readable storage medium for storing instructions that when executed by the one or more computer processors cause the one or more computer processors to perform steps of the above methods.

System Environment

FIG. 1 is a high-level block diagram of a system environment 100 for a data processing service 102, in accordance with an embodiment. The system environment 100 shown by FIG. 1 includes one or more client devices 116A, 116B, a network 120, a data processing service 102, and a data storage system 110. In alternative configurations, different and/or additional components may be included in the system environment 100.

The data processing service 102 is a service for managing and coordinating data processing services (e.g., database services) to users of client devices 116. The data processing service may manage one or more applications that users of client devices 116 can use to communicate with the data processing service 102. Through an application of the data processing service 102, the data processing service 102 may receive requests (e.g., database queries) from users of client devices 116 to perform one or more data processing functionalities on data stored, for example, in the data storage system 110. The requests may include query requests, analytics requests, or machine learning and artificial intelligence requests, and the like, on data stored by the data storage system 110. The data processing service 102 may provide responses to the requests to the users of the client devices 116 after they have been processed.

Figure 5:
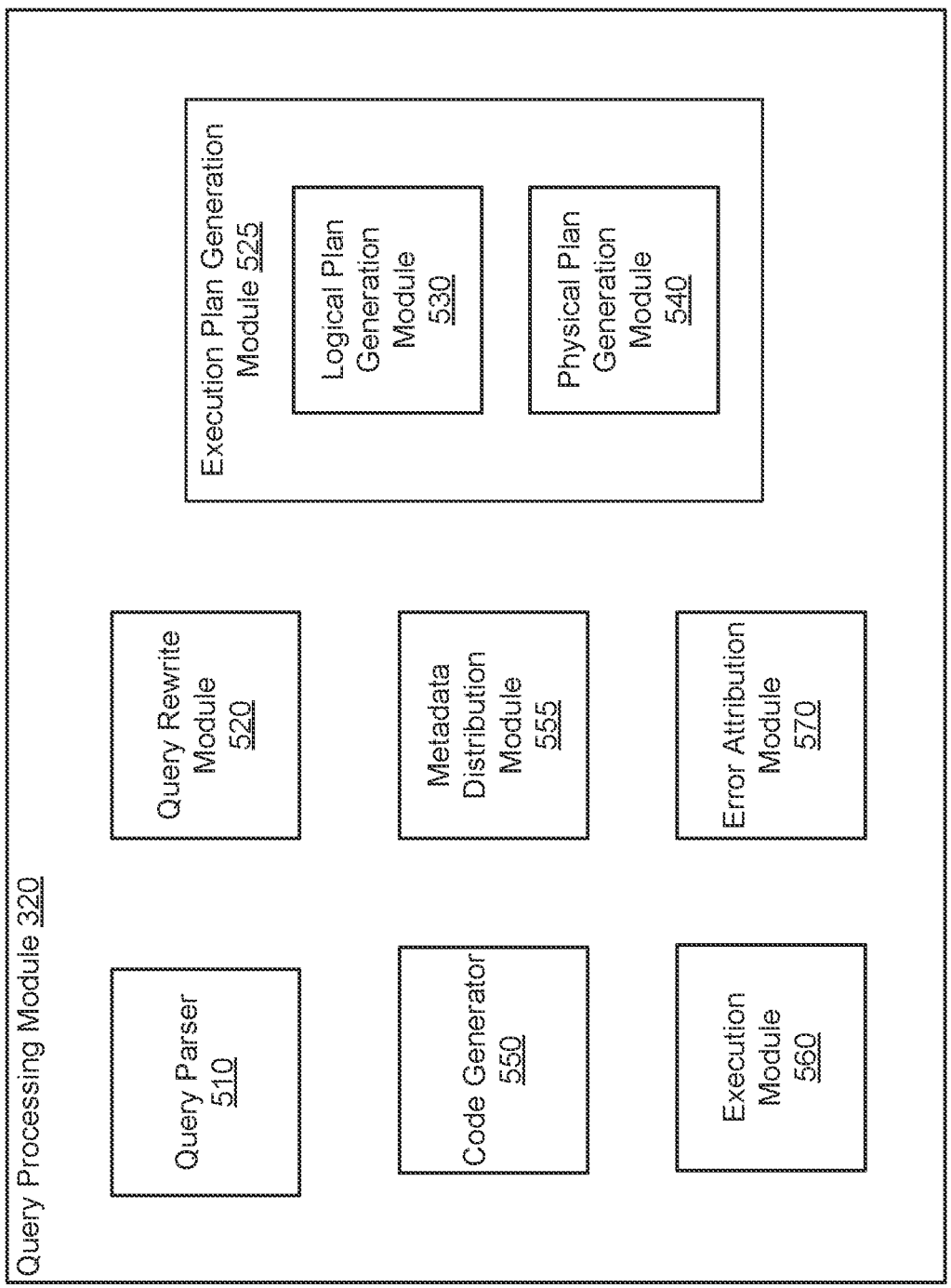
FIG. 5 illustrates the architecture of a query processing module for performing runtime error attribution of database queries according to an embodiment.

In one embodiment, as shown in the system environment 100 of FIG. 1, the data processing service 102 includes a control layer 106 and a data layer 108. The components of the data processing service 102 may be configured by one or more servers and/or a cloud infrastructure platform. In one embodiment, the control layer 106 includes a query processing module as illustrated in FIG. 5 and described in relation to FIG. 5. the control layer 106 receives data processing requests and coordinates with the data layer 108 to process the requests from client devices 116. The control layer 106 may schedule one or more jobs for a request or receive requests to execute one or more jobs from the user directly through a respective client device 116. The control layer 106 may distribute the jobs to components of the data layer 108 where the jobs are executed.

The control layer 106 is additionally capable of configuring the clusters in the data layer 108 that are used for executing the jobs. For example, a user of a client device 116 may submit a request to the control layer 106 to perform one or more queries and may specify that four clusters on the data layer 108 be activated to process the request with certain memory requirements. Responsive to receiving this information, the control layer 106 may send instructions to the data layer 108 to activate the requested number of clusters and configure the clusters according to the requested memory requirements.

The data layer 108 includes multiple instances of clusters of computing resources that execute one or more jobs received from the control layer 106. Accordingly, the data layer 108 may include a cluster computing system for executing the jobs. An example of a cluster computing system 402 is described in relation to FIG. 4. In one instance, the clusters of computing resources are virtual machines or virtual data centers configured on a cloud infrastructure platform. In one instance, the data layer 108 is configured as a multi-tenant architecture where a plurality of data layer instances process data pertaining to various tenants of the data processing service 102. Accordingly, a single instance of the software and its supporting infrastructure serves multiple customers, each customer associated with multiple users that may access the multi-tenant system. Each customer represents a tenant of a multi-tenant system and shares software applications and also resources such as databases of the multi-tenant system. Each tenant's data is isolated and remains invisible to other tenants. For example, a respective data layer instance can be implemented for a respective tenant. However, it is appreciated that in other embodiments, single tenant architectures may be used.

The data layer 108 thus may be accessed by, for example, a developer through an application of the control layer 106 to execute code developed by the developer. In one embodiment, a cluster in a data layer 108 may include multiple worker nodes (e.g., executor nodes shown in FIG. 4) that execute multiple jobs in parallel. Responsive to receiving a request, the data layer 108 divides the cluster computing job into a set of worker jobs, provides each of the worker jobs to a worker node, receives worker job results, stores job results, and the like. The data layer 108 may include resources not available to a developer on a local development system, such as powerful computing resources to process very large data sets. In this manner, when the data processing request can be divided into jobs that can be executed in parallel, the data processing request can be processed and handled more efficiently with shorter response and processing time.

The data storage system 110 includes a device (e.g., a disc drive, a hard drive, a semiconductor memory) used for storing database data (e.g., a stored data set, portion of a stored data set, data for executing a query). In one embodiment, the data storage system 110 includes a distributed storage system for storing data and may include a commercially provided distributed storage system service. Thus, the data storage system 110 may be managed by a separate entity than an entity that manages the data processing service 102 or the data storage system 110 may be managed by the same entity that manages the data processing service 102.

The client devices 116 are computing devices that display information to users and communicate user actions to the systems of the system environment 100. While two client devices 116A, 116B are illustrated in FIG. 1, in practice many client devices 116 may communicate with the systems (e.g., data processing service 102 and/or data storage system 110) of the system environment 100. In one embodiment, a client device 116 is a conventional computer system, such as a desktop or laptop computer. Alternatively, a client device 116 may be a device having computer functionality, such as a personal digital assistant (PDA), a mobile telephone, a smartphone or another suitable device. A client device 116 is configured to communicate with the various systems of the system environment 100 via the network 120, which may comprise any combination of local area and/or wide area networks, using both wired and/or wireless communication systems.

In one embodiment, a client device 116 executes an application allowing a user of the client device 116 to interact with the various systems of the system environment 100 of FIG. 1. For example, a client device 116 can execute a browser application to enable interaction between the client device 116 and the data processing service 102 via the network 120. In another embodiment, the client device 116 interacts with the various systems of the system environment 100 through an application programming interface (API) running on a native operating system of the client device 116, such as IOS® or ANDROID™.

Figure 2:
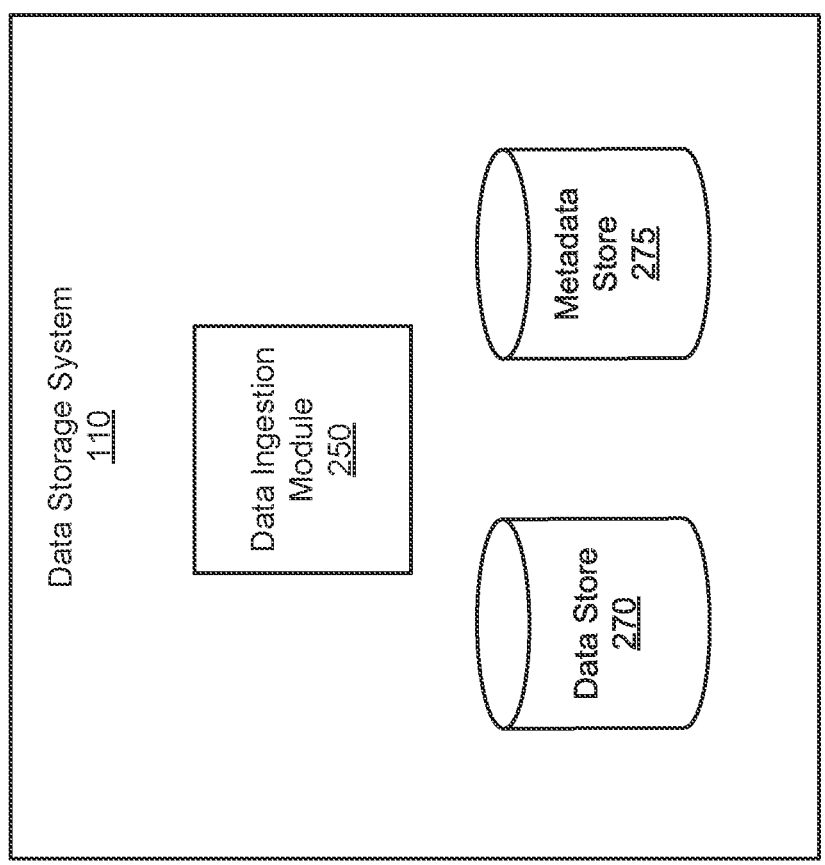
FIG. 2 is a block diagram of an architecture of a data storage system, in accordance with an embodiment.

FIG. 2 is a block diagram of an architecture of a data storage system 110, in accordance with an embodiment. As shown, the data storage system 110 includes a data ingestion module 250, a data store 270 and a metadata store 275.

The data store 270 stores data associated with different tenants of the data processing service 102. In one embodiment, the data in the data store 270 is stored in a format of a data table. A data table may include a plurality of records or instances, where each record may include values for one or more features. The records may span across multiple rows of the data table and the features may span across multiple columns of the data table. In other embodiments, the records may span across multiple columns and the features may span across multiple rows. For example, a data table associated with a security company may include a plurality of records each corresponding to a login instance of a respective user to a website, where each record includes values for a set of features including user login account, timestamp of attempted login, whether the login was successful, and the like. In one embodiment, the plurality of records of a data table may span across one or more data files. For example, a first subset of records for a data table may be included in a first data file and a second subset of records for the same data table may be included in another second data file.

In one embodiment, a data table may be stored in the data store 270 in conjunction with metadata stored in the metadata store 275. In one instance, the metadata includes transaction logs for data tables. Specifically, a transaction log for a respective data table is a log recording a sequence of transactions that were performed on the data table. A transaction may perform one or more changes to the data table that may include removal, modification, and additions of records and features to the data table, and the like. For example, a transaction may be initiated responsive to a request from a user of the client device 116. As another example, a transaction may be initiated according to policies of the data processing service 102. Thus, a transaction may write one or more changes to data tables stored in the data storage system 110.

Figure 3:
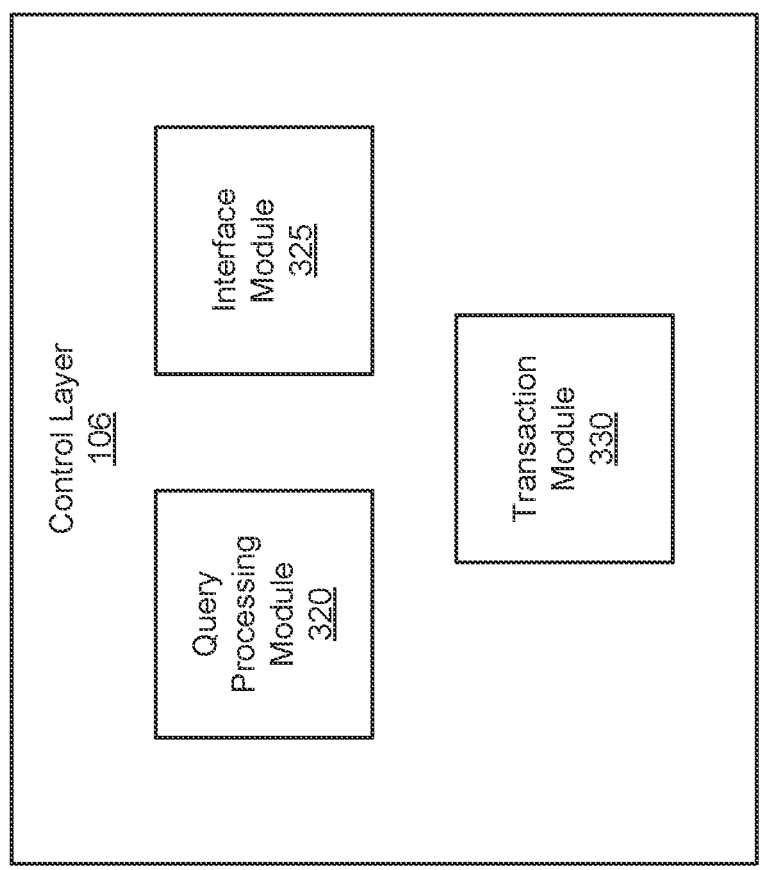
FIG. 3 is a block diagram of an architecture of a control layer, in accordance with an embodiment.

FIG. 3 is a block diagram of an architecture of a control layer 106, in accordance with an embodiment. As shown, the data processing service 102 includes an interface module 325, a transaction module 330, and a query processing module 320.

The interface module 325 provides an interface and/or a workspace environment where users of client devices 116 (e.g., users associated with tenants) can access resources of the data processing service 102. For example, the user may retrieve information from data tables associated with a tenant, submit data processing requests such as query requests on the data tables, through the interface provided by the interface module 325. The interface provided by the interface module 325 may include notebooks, libraries, experiments, queries submitted by the user, and the like. In one embodiment, a user may access the workspace via a user interface (UI), a command line interface (CLI), or through an application programming interface (API) provided by the workspace module 325.

For example, a notebook associated with a workspace environment is a web-based interface to a document that includes runnable code, visualizations, and explanatory text. A user may submit data processing requests on data tables in the form of one or more notebook jobs. The user provides code for executing the one or more jobs and indications such as the desired time for execution, number of cluster worker nodes for the jobs, cluster configurations, a notebook version, input parameters, authentication information, output storage locations, or any other type of indications for executing the jobs. The user may also view or obtain results of executing the jobs via the workspace.

The transaction module 330 receives requests to perform one or more transaction operations from users of client devices 116. As described in conjunction in FIG. 2, a request to perform a transaction operation may represent one or more requested changes to a data table. For example, the transaction may be to insert new records into an existing data table, replace existing records in the data table, delete records in the data table. As another example, the transaction may be to rearrange or reorganize the records or the data files of a data table to, for example, improve the speed of operations, such as queries, on the data table. For example, when a particular version of a data table has a significant number of data files composing the data table, some operations may be relatively inefficient. Thus, a transaction operation may be a compaction operation that combines the records included in one or more data files into a single data file.

The query processing module 320 receives and processes queries that access data stored by the data storage system 110. The query processing module 320 may reside in the control layer 106. The queries processed by the query processing module 320 are referred to herein as database queries. The database queries are specified using a declarative database query language such as the SQL. The query processing module 320 compiles a database query specified using the declarative database query language to generate executable code that is executed. The query processing module 320 may encounter runtime errors during execution of a database query and returns information describing the runtime error including an origin of the runtime error representing a position of the runtime error in the database query.

Figure 4:
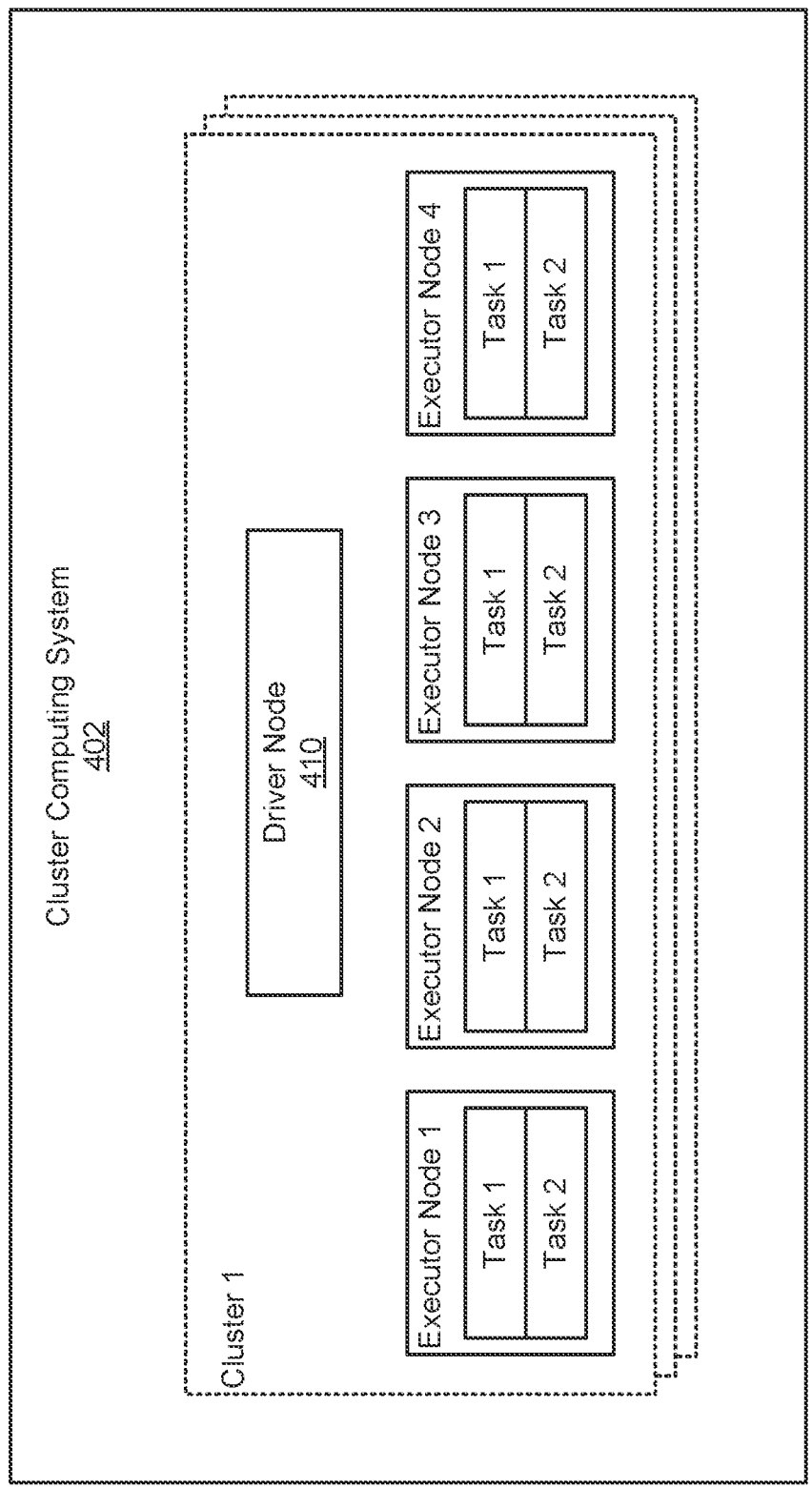
FIG. 4 is a block diagram of an architecture of a cluster computing system of the data storage system, in accordance with an embodiment.

FIG. 4 is a block diagram of an architecture of a cluster computing system 402 of the data layer 108, in accordance with an embodiment. In some embodiments, the cluster computing system 402 includes one or more computing clusters (e.g., cluster 1) that each include a driver node 410 and a worker pool of multiple executor nodes. The driver node 410 receives one or more jobs for execution, divides a job into job stages, and provides job stages to executor nodes, receives job stage results from the executor nodes of the worker pool, and assembles job stage results into complete job results, and the like.

The worker pool can include any appropriate number of executor nodes (e.g., 4 executor nodes, 12 executor nodes, 253 executor nodes, and the like). Each executor node in the worker pool includes one or more execution engines (not shown) for executing one or more tasks of a job stage. In one embodiment, an execution engine performs single-threaded task execution in which a task is processed using a single thread of the CPU. The executor node distributes one or more tasks for a job stage to the one or more execution engines and provides the results of the execution to the driver node 410. According to an embodiment, an executor node executes the database query for a particular subset of data that is processed by the database query.

System Architecture of Query Processing Module

FIG. 5 illustrates the architecture of a query processing module 320 for performing runtime error attribution of database queries, according to an embodiment. The query processing module 320 includes a query parser 510, a query rewrite module 520, an execution plan generation module 525, a code generator 550, an execution module 560, and an error attribution module 570. Other embodiments may include more or fewer modules.

The query parser 510 receives a database query for processing and parses the database query. The database query is specified using a declarative database query language such as SQL. The query parser 510 parses the database query to identify various tokens of the database query and build a data structure representation of the database query. The data structure representation identifies various components of the database query, for example, any SELECT expressions that are returned by the database query, tables that are input to the query, a conditional clause of the database query, a group by clause, and so on. According to an embodiment, the data structure representation of the database query is a graph model based on the database query.

The query rewrite module 520 performs transformations of the database query, for example, to improve the execution of the query. The improvement may be in terms of execution time, memory utilization, or other resource utilization. A database query may process one or more tables that store a significant number of records that are processed by the database query. Since the declarative database query language does not specify the procedure for determining the result of the database query, there are various possible procedures for executing the database query. The query rewrite module 520 may transform the query to change the order of processing of certain steps, for example, by changing the order in which tables are joined, by changing the order in which certain operations such as filtering of records of a table is performed in relation to other operations. The query rewrite module 520 may transform the database query to cause certain temporary results to be materialized. The query rewrite module 520 may eliminate certain operations if the operations are determined to be redundant. The query rewrite module 520 may transform a database query so that certain computations such as subqueries or expressions are shared. The query rewrite module 520 may transform the database query to pushdown certain computations, for example, by changing the order in which certain predicates are applied to the computation as early as possible. The query rewrite module 520 may transform the database query to modify certain predicates to use more optimized versions of the predicates that are computationally equivalent but provide better performance.

The execution plan generation module 525 generates execution plans for executing the database query. The execution plan represents a set of operations generated by the query processing module 320 from a database query to process data stored by the data storage system 110 (e.g., in a database) as specified by the database query and return the results requested. According to an embodiment, the execution plan is represented as a tree data structure or a graph data structure (e.g., a directed acyclic graph) where the nodes are various operators that perform specific computations needed. An execution plan may be a logical plan or a physical plan. The execution plan generation module 525 includes a logical plan generation module 530 and a physical plan generation module 540.

The logical plan generation module 530 generates a logical plan for the database query. The logical plan includes representation of the various steps that need to be executed for processing the database query. According to an embodiment, the logical plan generation module 530 generates an unresolved logical plan based on the transformed query graph representation. Various relation names (or table names) and column names may not be resolved in an unresolved logical plan. The logical plan generation module 530 generates a resolved logical plan from the unresolved logical plan by resolving the relation names and column names in the unresolved logical plan. The logical plan generation module 530 further optimizes the resolved logical plan to obtain an optimized logical plan.

The physical plan generation module 540 generates a physical plan from the logical plan generated by the logical plan generation module 530. The physical plan specifies details of how the logical plan is executed by the data processing service 102. The physical plan generation module 540 may generate different physical plans for the same logical plan and evaluate each physical plan using a cost model to select the optimal physical plan for execution. The physical plan further specifies details of various operations of the logical plan. As an example, if the logical plan includes a join operator, the physical plan may specify the type of join that should be performed for implementing the join operator. For example, the physical plan may specify whether the join operator should be implemented as a hash join, merge join, or sort join, and so on. The physical plan may be specific to a database system, whereas the logical plan may be independent of database systems and may be executed on any target database system by converting to a physical plan for that target database system.

The code generator 550 generates code representing executable instructions for implementing the physical plan for executing a database query. The generated code includes a set of instructions for each operator specified in the execution plan. The generated code is specified using a programming language that may be compiled and executed.

The execution module 560 executes the generated code corresponding to the database query. The execution module 560 accesses the data stored in the data storage system 110 as specified by the database query and performs the various instructions as specified by the generated code to return the results according to the database query. For example, if the database query processes records of a table, the execution module 560 may access records of the database table from the data storage system 110 and process each record as specified by the database query. The execution module 560 may encounter a runtime error while executing the instructions of the generated code.

The database query may be executed in parallel by multiple executor nodes as illustrated in FIG. 4. In this embodiment, the database query may be compiled by a driver node 410 that generates an execution plan and the error attribution mapping. The metadata distribution module 555 executing in the driver node 410 distributes the query information including the generated code and error attribution mapping to the executor nodes. The executor nodes execute the query based on the received information. If the generated code returns an error in any of the executor nodes, the executor node determines the origins of the error and returns the error information to the driver node 410. The driver node 410 returns the error information, for example, to a client device 116 that sent the database query.

The representation of a database query from the source database query that is received from an application or client device to the physical plan causes the representation of the database query to change significantly. For example, the following is a portion of a representation of a physical plan for a database query.

```
== Physical Plan ==
AdaptiveSparkPlan isFinalPlan=false
+- Project [(outer(f.d) + max(c))#179302 AS spark_catalog.glen.f(d)#179289]
   +- BroadcastHashJoin
[knownfloatingpointnormalized(normalizenanandzero(coalesce(d#179288, 0.0))),
isnull(d#179288)],
[knownfloatingpointnormalized(normalizenanandzero(coalesce(d#179291, 0.0))),
isnull(d#179291)], LeftOuter, BuildRight, false
      :- FileScan parquet spark_catalog.glen.t2[d#179288] Batched: true, DataFilters: [ ],
Format: Parquet, Location: PreparedDeltaFileIndex(1
paths)[dbfs:/user/hive/warehouse/glen.db/t2], PartitionFilters: [ ], PushedFilters: [ ],
ReadSchema: struct<d:double>
      +- BroadcastExchange
HashedRelationBroadcastMode(ArrayBuffer(knownfloatingpointnormalized(normaliz
enanandzero(coalesce(input[1, double, true], 0.0))), isnull(input[1, double,
true])),false), [plan_id=176270]
         +- Project [(d#179291 + max(c#179295)#179301) AS (outer(f.d) +
max(c))#179302, d#179291]
```

Since each transformation of a representation of the database query modifies the representation, the final representation becomes significantly different from the database query that was received. For example, an execution plan as complex that shown above can be the execution plan for a simple database query such as "SELECT x/y AS c FROM t1". As a result, if a position of runtime error is identified in a generated representation, for example, the physical plan of the database query, the user may not be able to analyze the root cause of the runtime error without significant effort in understanding the physical plan of the database query. Understanding the physical plan of a database query requires understanding of the technical details of how the query processing module 320 transforms and optimizes the database query. This is contrary to the goal of allowing users to write database queries using a declarative database query language that hides the procedural details of the query processing from the user.

Accordingly, for each stage of transformation performed by the query processing module 320 that maps a representation R1 of the database query to a representation R2 of the database query, the query processing module 320 maintains mapping from each portion P1 of the representation R2 to corresponding portion P2 of representation R1 that was used to generate the portion P1. For example, if both representations R1 and R2 are graphs, and a node N11 of graph R1 is used to generate a set of nodes {N21, N22, N23} of graph R2, the query processing module 320 maintains mappings from nodes N21, N22, N23 to node N11. The query processing module 320 uses these mappings to identify the origin of a runtime error. The mapping from generated code to portions of database query is referred to herein as the error attribution mapping.

According to an embodiment, the query processing module 320 carries over origins associated with a portion of a representation of the database query to the next representation of the database query as the query processing module 320 generates the various representations. For example, the query processing module 320 uses the source database query to identify corresponding origins in the graph representation of the database query. When the query processing module 320 rewrites the database query to generate a transformed graph representation, the query processing module 320 carries over the origins to the transformed graph representation. In the above example, assume that the node N11 of representation R1 is associated with origins O1 and O2 that caused the generation of the node N11. When the query processing module 320 generates the representation R2 such that node N11 results in generation of the set of nodes {N21, N22, N23} of graph R2, the query processing module 320 carries over the origins and assigns the origins O1 and O2 to each of the nodes N21, N22, N23. This process continues through all the transformations performed by the query processing module 320.

For example, the query processing module 320 identifies origins in the initial graph representation of the database query by mapping portions of the database query to nodes N21, N22, N23 of the graph representation. The query processing module 320 carries over the origin information from the graphs representation to the transformed graph representation. The query processing module 320 carries over the origin information from the transformed graph representation to the different logical plans including the unresolved logical plan, the resolved logical plan, and the optimized logical plan. The query processing module 320 carries over the origin information from the logical plans to the physical plan. The query processing module 320 carries over the origin information from the physical plan to the generated code. As a result, if a runtime error is encountered in the generated code, the query processing module 320 reports the origins of the runtime error.

According to an embodiment, for each portion of a representation of the database query the query processing module 320 stores a stack of origins. A database query may comprise one or more objects, where an object represents a database query statement, a function, a view, and so on. Each object comprises text in the declarative database query language. An object has an object type (e.g., query, view, function, and so on), and an object name (e.g., query identifier or query name, view name, function name, and so on). The stack of origins may include an origin in each object associated with the source database query, for example, an origin in the query text, an origin in each function invoked by the database query, as well as origins in views processed by the database query.

According to an embodiment, each origin stores the following information: a portion of the source database query text or a link (pointer) to the source database query text; the starting position of the source database query text; the corresponding ending position the source database query text; the object type providing the source database query text (e.g., query, view, SQL function, etc.); and the object name (e.g., query id, view name, SQL function name, etc.) Storing a stack of "origin" makes it possible to find the runtime error attribution from SQL views, SQL functions, etc.

According to an embodiment, the query processing module 320 minimizes the memory usage of the origin fields. The query processing module 320 stores the origin fields including query text/object type/object name of origin fields within one representation of the database query and uses references to the fields when carrying over the origin information to a subsequent representation of the database query by using memory references. As a result, the only additional memory usage required for storing an origin for a subsequent representation of the database query comprises two integers per operator (the starting/ending positions).

Error Attribution in Database Queries

The error attribution module 570 determines an origin for an error encountered while executing the generated code for a database query. The origin refers to a specific portion of the database query that is connected with the error that was generated. The data processing service 102 returns the error encountered while running the database query along with the origin that represents a portion of the database query representing a root cause of the error. According to an embodiment, the error attribution module 570 may represent the origin of an error by specifying a line number of the database query and a position within the line corresponding to the line number. The query processing module 320 may associate different portions of the database query with origin identifiers that represent temporary identifiers that are unique to the database query. The error attribution module 570 may represent the origin of an error by specifying an origin identifier of a portion of the database query that represents a root cause of the error. For example, the query processing module 320 may associate different subqueries of the database query with identifiers and report the identifier of a subquery that is associated with an error.

As an example, the execution module 560 may encounter a division by zero runtime error while performing a division operation if the denominator of the division operator is zero. The database query may include multiple mathematical expressions or a single complex mathematical expression. As a result, there may be multiple division operators within the database query. The error attribution module 570 maps the division by zero runtime error to the appropriate division operator of the database query that caused the division by zero error and returns the position of the division operator as the origin of the runtime error.

The execution module 560 may encounter a time-out error if a set of instructions implementing a certain operator of the execution plan takes longer than a threshold time for execution, for example, if a join operation takes more than the threshold amount of time allotted for completing a join operation. The error attribution module 570 maps the time-out error to the appropriate operator of the database query that caused the time-out error, for example, a particular join operator. The error attribution module 570 returns the position of the operator that caused the time-out error as the origin of the runtime error.

The execution module 560 may encounter an out-of-memory error if a set of instructions implementing a certain operator of the execution plan use more than a threshold amount of memory for execution, for example, if a join operation takes more than the threshold amount of memory for completing a join operation thereby causing a process executing the database query to run out of memory. The error attribution module 570 maps the out-of-memory error to the appropriate operator of the database query that caused the out-of-memory error, for example, a particular join operator. The error attribution module 570 returns the position of the operator that caused the out-of-memory error as the origin of the runtime error.

The execution module 560 may encounter other database-specific runtime errors, for example, if a scalar subquery returns multiple values. The error attribution module 570 maps the runtime error to the appropriate subquery of the database query that caused the runtime error and returns an identifier of the subquery as the origin of the runtime error.

Following is an example of a database query with multiple division operators.

```
SELECT
    a / b AS c1,
    x / y AS c2
FROM t;
```

If the error attribution module 570 encounters a division by zero error while executing this query, the error attribution module 570 reports the error along with the origin of the error as follows. In this situation, the division by zero error was encountered because the value of b was zero in the expression a/b.

```
Division by zero.
== SQL (line 2, position 3)
SELECT
    a / b AS c1, x / y AS c2
FROM t;
```

Accordingly, the error attribution module 570 reports the type of error (Division by zero) and identifies the origin of the runtime error using a line number and position within the database query. The error attribution module 570 may highlight the portion of the database query that represents the origin, for example, by changing the font of that portion of the text, by underlining, by highlighting, or using any other visual technique to distinguish that portion of the database query from the remaining portions of the database query.

Following is an example database query that includes multiple subqueries. Each subquery is a scalar query. A key property of a scalar subquery is that it is only allowed to return at most one row. If more rows are returned a runtime error must be raised.

```
SELECT
    (SELECT c1 FROM t WHERE t.id = s.id LIMIT 2) c1,
    (SELECT c2 FROM t WHERE t.id > s.id LIMIT 2) c2
FROM s;
```

The error attribution module 570 encounters a runtime error and reports the runtime error as follows.

```
A scalar subquery returns more than one row.
== SQL (line 3, position 3) ==
SELECT
    (SELECT c1 FROM t WHERE t.id = s.id LIMIT 2) c1,
    (SELECT c2 FROM t WHERE t.id > s.id LIMIT 2) c2

FROM s
```

Accordingly, the error attribution module 570 encounters an error that a scalar subquery returned multiple values and identifies the origin of the runtime error using a line number and position within the database query. The error attribution module 570 may distinguish the subquery text that represents the origin, using any of the above techniques such as highlighting, underlying, changing font, and so on.

As another example, the error attribution module 570 processes the following subquery that uses a function and a view.

```
CREATE VIEW v AS SELECT x / y AS c FROM t1;
CREATE FUNCTION f(d DOUBLE) RETURNS DOUBLE
    RETURN SELECT d + MAX(c) FROM v;
SELECT f(d) FROM t2;
```

If a runtime error is encountered while running the query, the error attribution module 570 identifies multiple origins of the runtime error, for example an origin O1 is identified in the database query, an origin O2 is identified in the function and an origin O3 is identified in the view definition. Each origin identifies the line number and position and optionally identifies a portion of the database query by underlining the portion.

```
Division by zero.
== SQL of VIEW v (line 1, position 7)
SELECT x / y AS c FROM t1

== SQL of FUNCTION f (line 1, position 23)
SELECT d + MAX(c) FROM v

== SQL (line 1, position 7)
SELECT f(d) FROM t2
```

These are illustrative examples. The error attribution module 570 may identify other types of runtime errors and other types of database queries, for example, database queries with multiple joins, group by clauses and aggregation operations, and so on.

Processes for Error Attribution in Query Processing

FIGS. 6-9 show flowcharts illustrating various processes associated with error attribution in database queries according to various embodiments. The steps are indicated as being executed by a system, for example, a database system of the data processing service 102 and may be executed by various modules of the database system, for example, query processing module 320. The steps may be executed in an order different from that indicated in the flowcharts. For example, certain steps may be executed in parallel.

Figure 6:
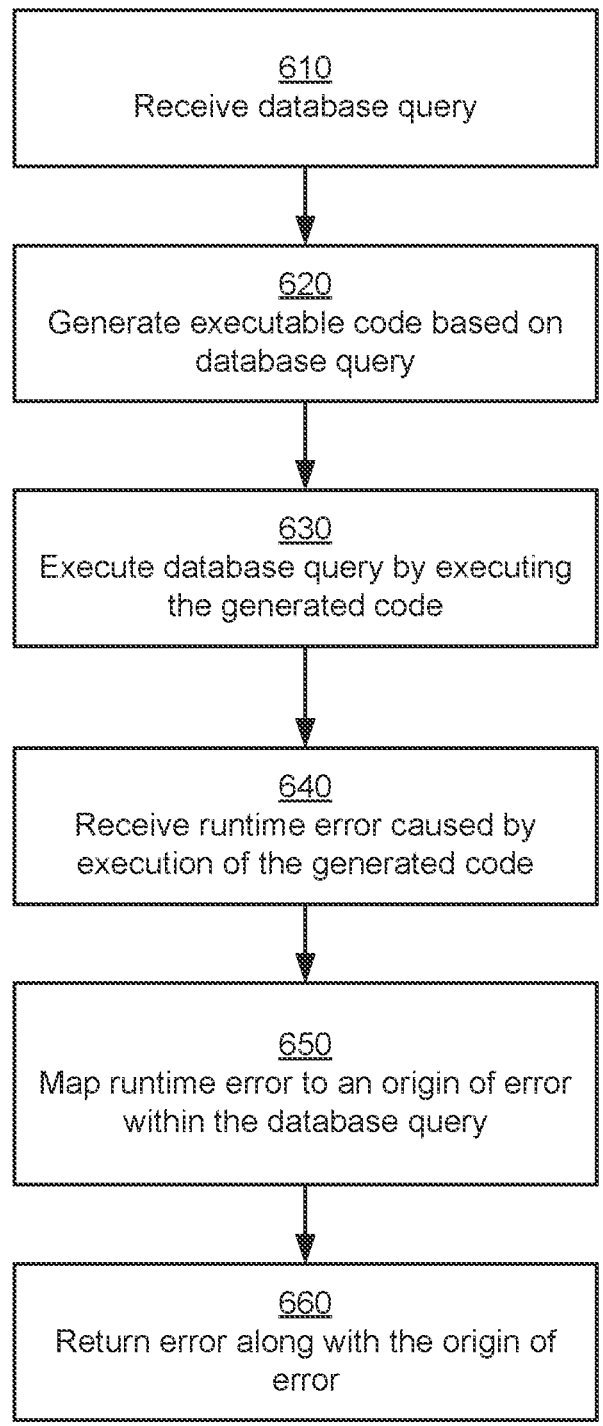
FIG. 6 shows a flowchart illustrating the overall process for attributing errors generated during execution of database queries according to an embodiment.

FIG. 6 shows a flowchart illustrating the overall process for attributing errors generated during execution of database queries according to an embodiment. The query processing module 320 receives 610 a database query specified using a declarative database query language such as SQL. The query processing module 320 generates 620 executable code based on the database query. The various sub-modules of the query processing module 320 may perform various steps such as query rewriting, execution plan generation, code generation, and so on for generating 620 the executable code. The execution module 560 of the query processing module 320 executes 630 the database query by executing the generated code. The execution of the generated code may complete without encountering any runtime errors. However, during certain executions, the query processing module 320 may receive 640 a runtime error caused by execution of the generated code. The error attribution module 570 of the query processing module 320 maps 650 the runtime error to an origin of error within the database query. The query processing module 320 returns 660 the runtime error along with one or more origins of the runtime error. For example, if the database query was received from a client device, the query processing module 320 sends the runtime error and the one or more origins of the runtime error to the client device.

Figure 7:
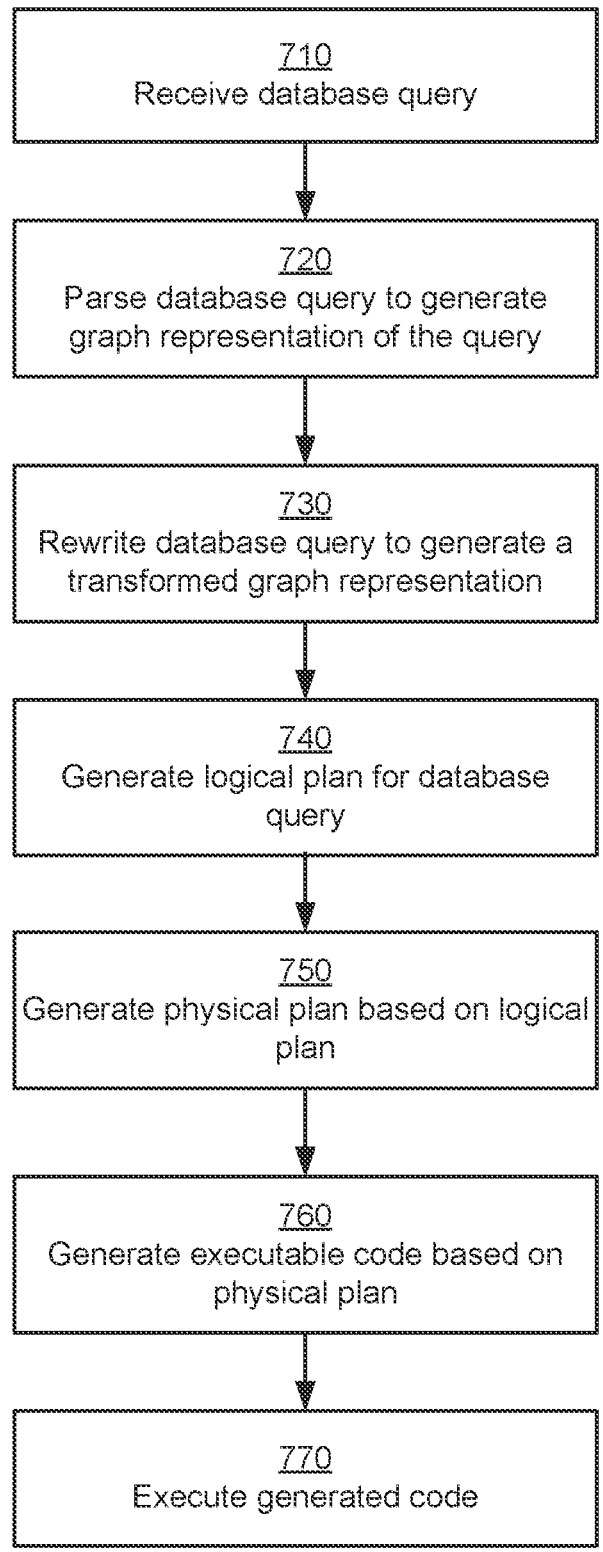
FIG. 7 shows a flowchart illustrating the process of execution of a database query according to an embodiment.

FIG. 7 shows a flowchart illustrating the process of execution of a database query according to an embodiment. The steps of the process are executed by various modules of the query processing module 320. The query processing module 320 receives 710 a database query. This step is similar to the step 610 of the flowchart illustrated in FIG. 6. The query parser 510 parses 720 the database query to generate a graph representation of the database query. The query rewrites module 520 of the query processing module 320 rewrites 730 the database query to generate a transformed graph representation of a transformed database query. The logical plan generation module 530 generates 740 a logical plan for the database query from the transformed graph representation of the database query. According to an embodiment, the logical plan generation module 530 generates an unresolved logical plan from the transformed graph representation of the database query. The logical plan generation module 530 generates a resolved logical plan from the unresolved logical plan. The logical plan generation module 530 generates an optimized plan from the resolved logical plan. The physical plan generation module 540 generates 750 a physical plan from the local plan, for example, from the optimized logical plan. The code generator 550 generates 760 executable code from the physical plan. The execution module 560 executes 770 the generated code.

Figure 8:
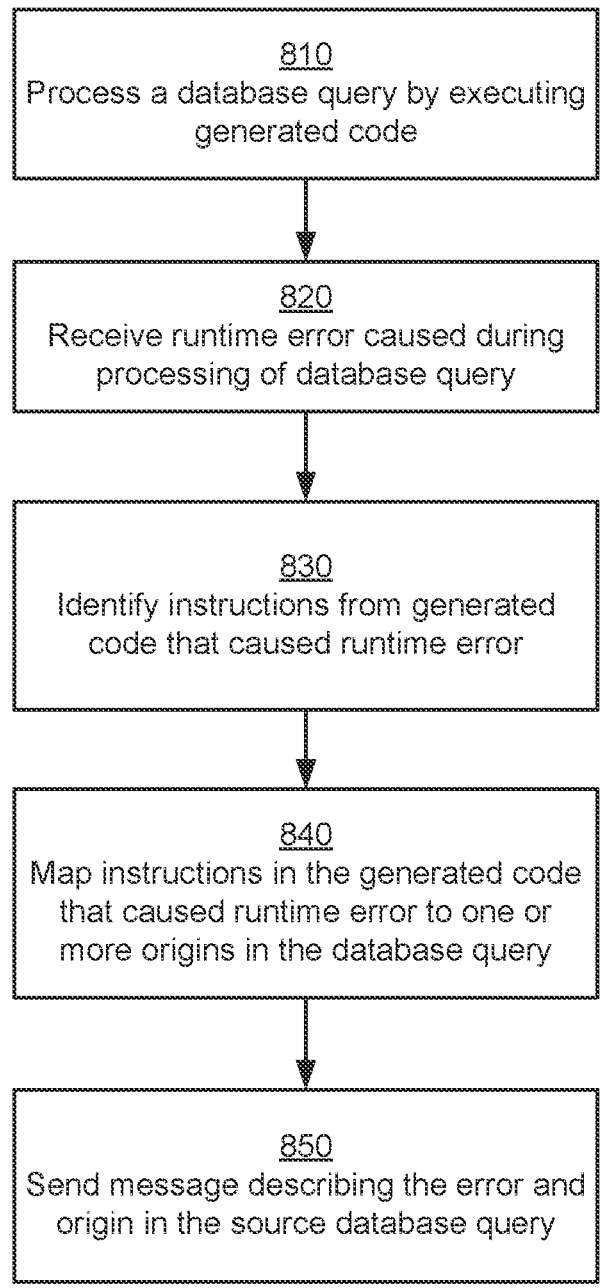
FIG. 8 shows a flowchart illustrating the process of attribution of errors encountered during execution of a database query according to an embodiment.

FIG. 8 shows a flowchart illustrating the process of attribution of errors encountered during execution of a database query according to an embodiment. The execution module 560 processes 810 a database query by executing code generated from the database query. The error attribution module 570 receives 820 a runtime error caused during execution of the database query. The error attribution module 570 identifies 830 a set of instructions of the generated code that caused the runtime error. The error attribution module 570 maps 840 the set of instructions of the generated code that caused the runtime error to one or more origins in the database query. The error attribution module 570 sends 850 a message describing the runtime error and one or more origins in the database query that mapped to the runtime error.

Distributed Execution of Database Query

In an embodiment in which the database query is executed in parallel using multiple executor nodes, each executor node running an execution engine for processing a subset of data for the database query, the data processing service 102 minimizes the cost of broadcasting the origin to the different executors. Broadcasting all the origin fields from a plan tree to all the executor nodes can be a computationally expensive task. The framework only gathers all the origin fields from the operators that can cause runtime errors. Before distributed execution, all the collected origin fields are broadcasted to the executor nodes in a batch.

Figure 9:
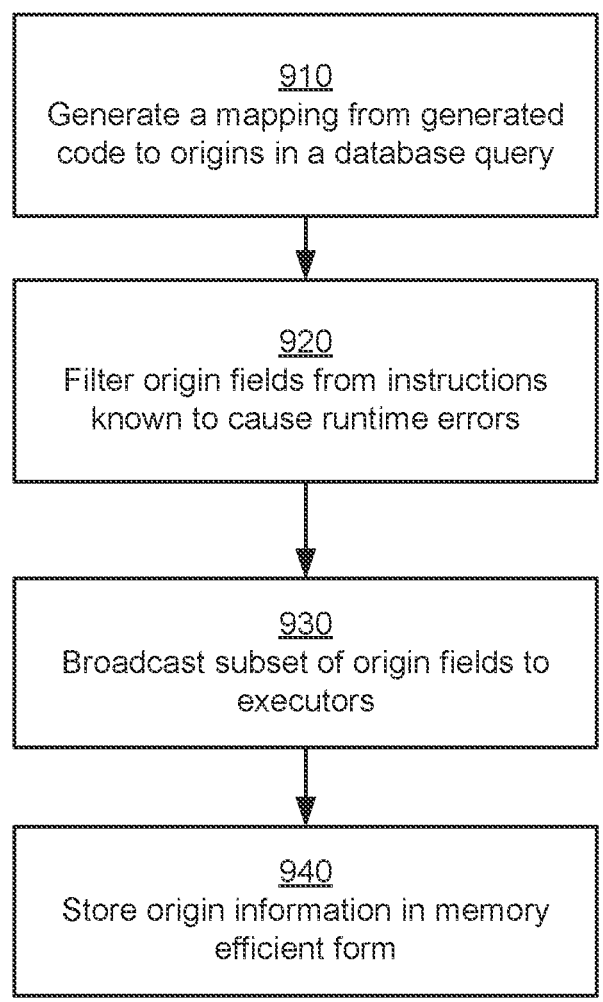
FIG. 9 shows a flowchart illustrating the process attribution of errors encountered during distributed execution of a database query according to an embodiment.

FIG. 9 shows a flowchart illustrating the process attribution of errors encountered during distributed execution of a database query according to an embodiment. The metadata distribution module 555 filters the mapping from sets of instructions of generated code to origins by eliminating one or more origins mapped to a set of instructions. According to an embodiment, the system filters the mapping by excluding from the mapping, operators known to not throw any error that is reported. The metadata distribution module 555 may perform the elimination of the origins based on a likelihood of the set of instructions causing runtime errors. Accordingly, the metadata distribution module 555 removes origins mapped to instructions that are not likely to cause runtime errors. The metadata distribution module 555 transmits the filtered mapping to each of the plurality of processing nodes.

According to an embodiment, the system maintains a list of operators that are known to cause a runtime error. For these operators, the system modifies the query execution by changing the evaluation code to inject the origin in the error code paths. The operators which have no runtime errors do not create their origins at the beginning.

The query processing module 320 compiles a database query to generate executable code and creates 910 a mapping from sets of instructions in the generated code to origins in the database query. There may be a large number of origins associated with various instructions of the generated code. The metadata distribution module 555 filters 920 the origins to eliminate some of the origins and obtain a subset of origins from instructions that are associated with specific runtime errors since these instructions are known to cause those runtime errors. For example, instructions that perform division are associated with division by zero error, scalar subqueries are associated with errors indicating multiple values returned by a scalar subquery, instructions performing join operations are associated with time our errors, and so on. The metadata distribution module 555 broadcasts the subsets of origins to computing systems running executors that process the database query in parallel. The executor nodes store 940 the origin information in memory in an efficient form.

CONCLUSION

Embodiments improve the usage of database systems for developers who are testing, debugging, and developing database queries and applications using database queries. In contrast, conventional systems report a stack trace when a runtime error is encountered. The stack trace typically includes several function calls that may be invoked when the runtime error was encountered. These function calls represent the underlying implementation of the database system and a user of the system is not expected to understand and analyze them.

Understanding the stack trace to determine the root cause of a runtime error requires significant understanding of the database technology and the implementation of the database system. For example, the stack trace identifies functions and methods of the database system that a developer using the database system is not expected to know. The system as disclosed provides high-level information based on the declarative database query statement that allows users to analyze the runtime error using the database query statement without understanding how the database system processes the database query. Accordingly, the system disclosed provides technical improvement to the technology of databases.

Computer Architecture

Figure 10:
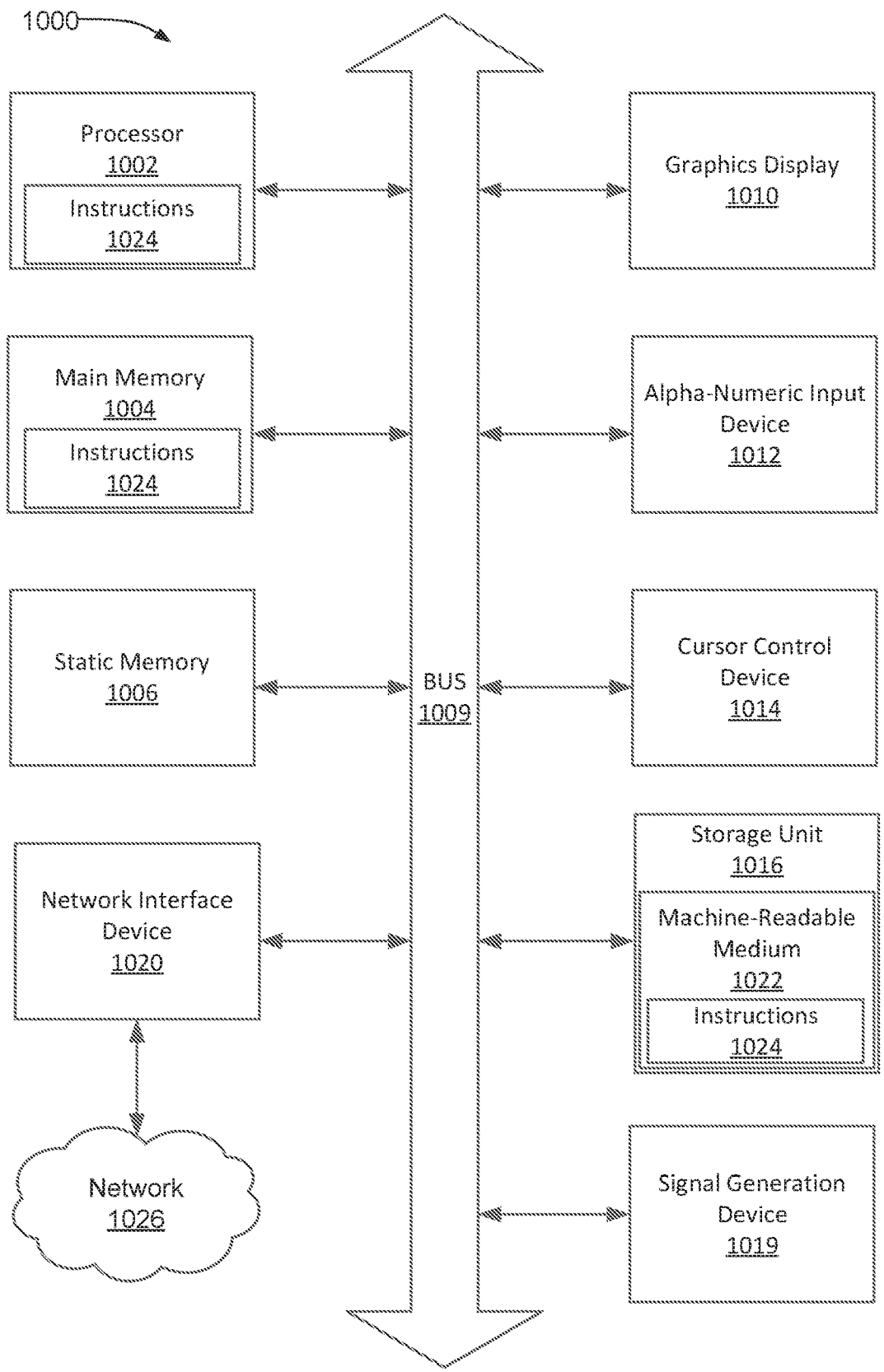
FIG. 10 illustrates an example computing machine for reading and executing computer-readable instructions, in accordance with an embodiment.

Turning now to FIG. 10, illustrated is an example machine to read and execute computer-readable instructions, in accordance with an embodiment. Specifically, FIG. 10 shows a diagrammatic representation of the data processing service 102 in the example form of a computer system 1000. The computer system 1000 can be used to execute instructions 1024 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes one or more processing units (generally processor 1002). The processor 1002 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The processor executes an operating system for the computing system 1000. The computer system 1000 also includes a main memory 1004. The computer system may include a storage unit 1016. The processor 1002, memory 1004, and the storage unit 1016 communicate via a bus 1008.

In addition, the computer system 1000 can include a static memory 1006, a graphics display 1010 (e.g., to drive a plasma display panel (PDP), a liquid crystal display (LCD), or a projector). The computer system 1000 may also include alphanumeric input device 1012 (e.g., a keyboard), a cursor control device 1014 (e.g., a mouse, a trackball, a joystick, a motion sensor, or other pointing instrument), a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. For example, the instructions 1024 may include instructions for implementing the functionalities of the query processing module 320. The instructions 1024 may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 may be transmitted or received over a network 1026, such as the network 120, via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store the instructions 1024. The term "machine-readable medium" shall also be taken to include any medium that is capable of storing instructions 1024 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments of has been presented for the purpose of illustration; it is not intended to be exhaustive or to limit the techniques disclosed to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer-readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer-readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A computer-implemented method for error attribution in database queries, the computer-implemented method comprising:
    receiving, from a client device, a database query specified using a declarative database query language;
    generating a graph data structure representing the database query;
    transforming the graph data structure to a transformed graph data structure;
    generating code based on the transformed graph data structure, wherein the generated code represents sets of instructions for executing the database query;
    generating an error attribution mapping that maps sets of instructions to origins of the sets of instructions, wherein an origin represents a portion of the database query;
    filtering the error attribution mapping by eliminating one or more origins from the error attribution mapping, wherein the elimination is performed based on a likelihood of the set of instructions causing runtime errors;
    transmitting the filtered error attribution mapping to a plurality of processing nodes;
    executing the generated code, in parallel by the plurality of processing nodes;
    determining a runtime error caused by executing the generated code;
    determining one or more origins of the runtime error in the database query based on the filtered error attribution mapping; and
    sending, to the client device, information describing the runtime error, the information comprising the one or more origins of the runtime error.

2. The computer-implemented method of claim 1, further comprising:
    determining a mapping from sets of instructions of generated code to origins in the database query, wherein a set of instruction is mapped to a particular origin representing a particular portion of the database query responsive to the set of instructions being generated based on the particular portion of the database query.

3. The computer-implemented method of claim 2, wherein determining the one or more origins of the runtime error in the database query comprises accessing the mapping to determine origins mapped to the set of instructions that caused the runtime error.

4. The computer-implemented method of claim 1, further comprising:
    generating an execution plan from the transformed graph data structure, the execution plan comprising nodes representing computations; and
    determining origins of nodes of the execution plan based on origins determined for nodes of the transformed graph data structure.

5. The computer-implemented method of claim 4, wherein generating the execution plan comprises:
    generating a logical execution plan from the transformed graph data structure;
    generating a physical execution plan from the logical execution plan;
    determining a mapping of nodes of the physical execution plan to nodes of the logical execution plan; and
    determining origins of nodes of the physical execution plan based on the mapping of nodes of the physical execution plan to nodes of the logical execution plan.

6. The computer-implemented method of claim 1, wherein the declarative database query language is the structured query language (SQL).

7. The computer-implemented method of claim 1, wherein an origin is represented as a line number of the database query and a position within a line of the database query corresponding to the line number.

8. The computer-implemented method of claim 1, wherein the database query is divided into a plurality of portions of the database queries, each portion of the database query having an origin identifier wherein an origin is represented as an origin identifier corresponding to a portion of the database query.

9. The computer-implemented method of claim 1, wherein the database query includes mathematical expressions comprising a plurality of division operators, wherein the runtime error is a division by zero error, wherein an origin of the runtime error represents a particular division operator from the plurality of division operators.

10. The computer-implemented method of claim 1, wherein the database query includes a plurality of subqueries, wherein an origin of the runtime error identifies a particular subquery from the plurality of subqueries.

11. The computer-implemented method of claim 1, wherein the database query includes a plurality of subqueries, wherein the runtime error indicates that multiple values were returned by a scalar query, wherein an origin of the runtime error is a particular subquery from the plurality of subqueries.

12. The computer-implemented method of claim 1, wherein the database query includes a plurality of operators, wherein the runtime error is an out of memory error indicating that an allotted amount of memory was exceeded, wherein an origin of the runtime error identifies an operator from the plurality of operators that causes the out of memory error.

13. The computer-implemented method of claim 1, wherein the database query includes a plurality of operators, wherein the runtime error is a time out error indicating that an allotted amount of time was exceeded, wherein an origin of the runtime error identifies an operator from the plurality of operators that caused a computation that exceeded the allotted amount of time.

14. The computer-implemented method of claim 1, wherein the database query processes one or more views, each view associated with a view definition, wherein an origin identifies a particular view and location within a view definition of the particular view definition.

15. The computer-implemented method of claim 1, wherein the database query processes one or more functions specified using the database query language, wherein an origin identifies a particular function and a location within the particular function.

16. A non-transitory computer-readable storage medium for storing instructions that when executed by one or more computer processors cause the one or more computer processors to:
receive, from a client device, a database query specified using a declarative database query language;
generate a graph data structure representing the database query;
transform the graph data structure to a transformed graph data structure;
generate code based on the transformed graph data structure, wherein the generated code represents sets of instructions for executing the database query;
generate an error attribution mapping that maps sets of instructions to origins of the sets of instructions, wherein an origin represents a portion of the database query;
filter the error attribution mapping by eliminating one or more origins from the error attribution mapping, wherein the elimination is performed based on a likelihood of the set of instructions causing runtime errors;
transmit the filtered error attribution mapping to a plurality of processing nodes;
execute the generated code, in parallel by the plurality of processing nodes;
determine a runtime error caused by executing the generated code;
determine one or more origins of the runtime error in the database query based on the filtered error attribution mapping; and
send, to the client device, information describing the runtime error, the information comprising the one or more origins of the runtime error.

17. The non-transitory computer-readable storage medium of claim 16, wherein the instructions further cause the one or more computer processors to:
generate an execution plan from the transformed graph data structure, the execution plan comprising nodes representing computations; and
determine origins of nodes of the execution plan based on origins determined for nodes of the transformed graph data structure.

18. The non-transitory computer-readable storage medium of claim 17, wherein the instructions that cause the one or more computer processors to generate the execution plan cause the one or more computer processors to:
generate a logical execution plan from the transformed graph data structure;
generate a physical execution plan from the logical execution plan;
determine a mapping of nodes of the physical execution plan to nodes of the logical execution plan; and
determine origins of nodes of the physical execution plan based on the mapping of nodes of the physical execution plan to nodes of the logical execution plan.

19. A computer system comprising:
one or more computer processors; and
a non-transitory computer-readable storage medium for storing instructions that when executed by the one or more computer processors cause the one or more computer processors to:
receive, from a client device, a database query specified using a declarative database query language;
generate a graph data structure representing the database query;
transform the graph data structure to a transformed graph data structure;
generate code based on the transformed graph data structure, wherein the generated code represents sets of instructions for executing the database query;
generate an error attribution mapping that maps sets of instructions to origins of the sets of instructions, wherein an origin represents a portion of the database query;
filter the error attribution mapping by eliminating one or more origins from the error attribution mapping, wherein the elimination is performed based on a likelihood of the set of instructions causing runtime errors;
transmit the filtered error attribution mapping to a plurality of processing nodes;
execute the generated code, in parallel by the plurality of processing nodes;
determine a runtime error caused by executing the generated code;
determine one or more origins of the runtime error in the database query, wherein each origin identifies a portion of the database query based on the filtered error attribution mapping; and
send, to the client device, information describing the runtime error, the information comprising the one or more origins of the runtime error.

* * * * *